United States Patent [19]

Ogorchock

[11] Patent Number: 4,968,186
[45] Date of Patent: Nov. 6, 1990

[54] MECHANICALLY STABILIZED EARTH SYSTEM AND METHOD OF MAKING SAME

[75] Inventor: John M. Ogorchock, Spring, Tex.
[73] Assignee: Tricon Precast, Inc., Houston, Tex.
[21] Appl. No.: 483,133
[22] Filed: Feb. 22, 1990
[51] Int. Cl.[5] .............................................. E02D 29/02
[52] U.S. Cl. .................................. 405/262; 403/381; 405/258; 405/284; 405/286
[58] Field of Search .............. 405/262, 258, 284, 285, 405/286; 403/381, 316, 317; 52/235

[56] References Cited

U.S. PATENT DOCUMENTS

| 1,083,289 | 1/1914 | Mason | 405/262 |
|---|---|---|---|
| 1,762,343 | 6/1930 | Munster | 405/262 |
| 3,535,204 | 10/1970 | Truxa | 403/381 X |
| 4,193,718 | 3/1980 | Wahrendorf et al. | 405/262 X |
| 4,266,890 | 5/1981 | Hilfiker | 405/286 |
| 4,324,508 | 4/1982 | Hilfiker et al. | 405/258 X |
| 4,342,524 | 8/1982 | Anderson | 403/381 X |
| 4,616,959 | 10/1986 | Hilfiker | 405/286 |
| 4,824,293 | 4/1989 | Brown et al. | 405/262 X |
| 4,834,584 | 5/1989 | Hilfiker | 405/284 X |

FOREIGN PATENT DOCUMENTS 381815 10/1932 United Kingdom ................ 405/262

Primary Examiner—Dennis L. Taylor
Attorney, Agent, or Firm—Arnold, White & Durkee

[57] ABSTRACT

A mechanically stabilized earth wall system, including an upright retaining wall of modular facing panels and a number of horiontal reinforcement units or anchors, including a novel connector to simply and quickly connect the horizontal reinforcement anchors to the modular facing panels.

20 Claims, 2 Drawing Sheets

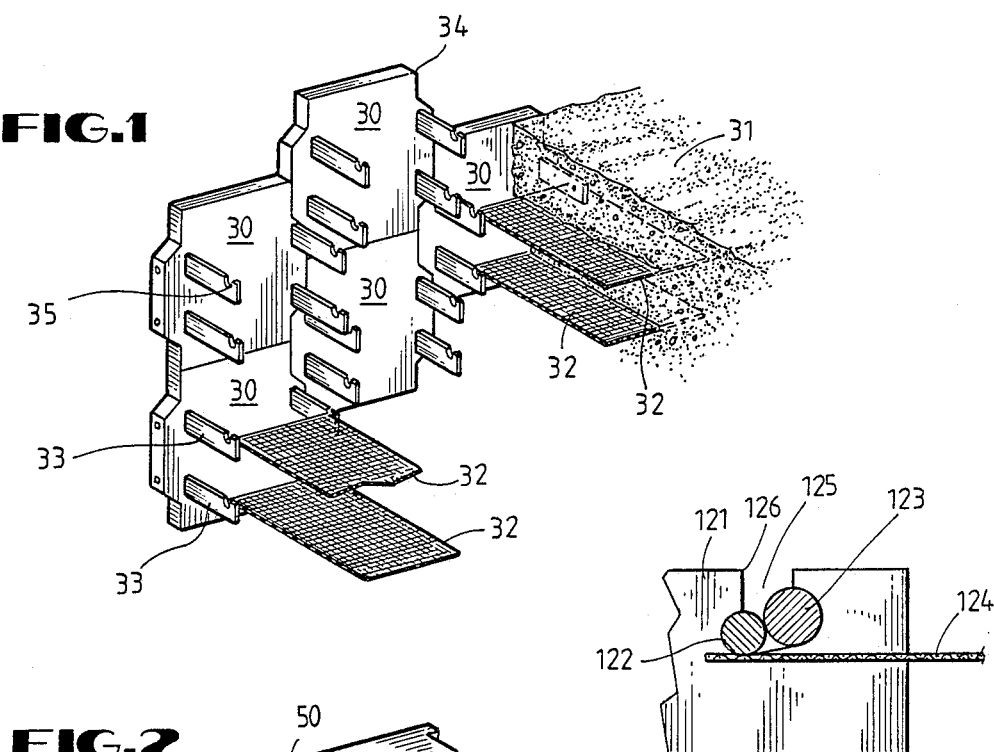
FIG. 1
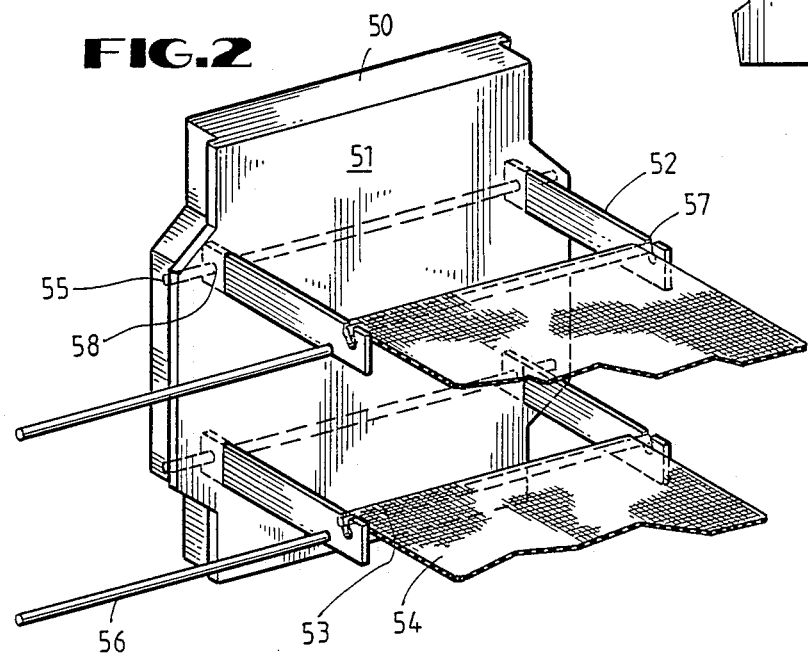
FIG. 2
FIG. 5B
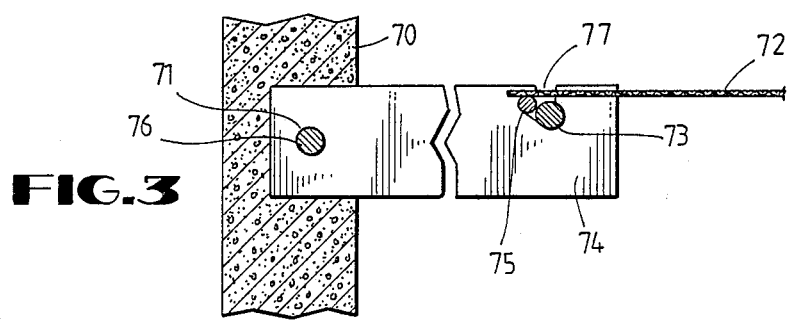
FIG. 3

MECHANICALLY STABILIZED EARTH SYSTEM AND METHOD OF MAKING SAME

BACKGROUND OF THE INVENTION

1. Field of the Invention

The present invention relates to mechanically stabilized earth wall structures. The invention more particularly concerns a modular wall or facing panel which interconnects with an anchor which in turn cooperates with backfill or the like to stabilize the panel. The invention is especially directed at a modular wall panel which is precast to include a connector which is quickly connectable to an anchor member.

2. Description of Related Art

A mechanically stabilized earth wall structure comprises a concrete wall facing with earth backfill placed behind the structure. Elongated members extend from the back surface of the wall into the earth backfill to form horizontal planes which act as anchors in the backfill. The elongated members may consist of various types of reinforcements or anchors.

Strip reinforcements or strip anchors, for example, include strips made of such materials as galvanized steel and plastic. Tensile stresses in the soil or backfill transfer to the strips through friction. Grid reinforcement units or grid anchors, consisting of metallic or polymeric tensile resistant grid elements, transfer stress to the backfill through passive resistance of transverse elements of the grid and friction between the backfill and horizontal surfaces of the grid. The grids in the form of a mesh or web may be made of various materials such as metals and polymer materials. Another type of anchor, a sheet anchor, consists of continuous sheets of geotextiles placed in horizontal layers within the backfill.

Several methods and apparatus have been provided in the past for attaching reinforcement members or anchor to the back surface of modular facing panels. For example, U.S. Pat. No. 4,725,170 discloses a method of connecting elongated wire mesh to interlocking facing wall modules by a means of a clevis and bolt assembly. The U-shaped portion of each clevis is anchored in the modular facing panels during precasting. In one embodiment, the wires in a wire mesh panel are connected to each clevis using a bolt and nut assembly.

In U.S. Pat. No. 4,824,293, connection between a tieback and a modular facing panel is formed by sliding an end of the tieback into a channel preformed in the panel and inserting a rod into the channel to prevent the withdrawal of the tieback.

U.S. Pat. No. 4,449,857 discloses a structure in which wire mesh panels are attached to modular facing panels by means of threaded female fittings anchored in the modular facing panels and threaded male fittings mounted to the end of elongated wires in the wire mesh panel.

Existing systems of stabilizing earth wall structures as reflected by the above references can entail considerable amounts of time and care to properly install such structures. As a result, the costs of installing such systems are frequently very high; and the risks of faulty installations can be considerable. The present invention overcomes the deficiencies in existing systems provides improved reliability and reduced cost.

SUMMARY OF THE INVENTION

The present invention is a system for stabilizing earth wall structures which comprises a special modular wall panel that simply and quickly interconnects with one or more anchors, which in turn interact with earth backfill. In one specific aspect, the invention comprises a mechanically stabilized earth wall structure comprising an upright or vertically disposed retaining wall formed from a plurality of interlocking modular facing panels having a front facing, a back facing, a top, and a bottom.

Each panel has one or more mooring units connected to each panel. Each mooring unit comprises a laterally disposed array of spaced connectors projecting from the back facing of the panel. Each connector has a first end of the connector extending into the panel. A second end of each connector projects from the wall including a opening extending into an edge of the connector terminating in a keyhole within the connector. The keyhole is located such that the keyhole extends beyond the back facing of the panel. As mentioned earlier, the projecting end of each connector is configured to provide a quick connection with a suitable anchor. Although the connecting mechanism may be any suitable latching or other interconnecting device which is compatible with the anchor, a preferred embodiment of such device comprises a keyhole into which a portion of the anchor may be inserted and locked.

A preferred component is a keyhole that is a J-slot which is formed in the top of each connector in a direction transverse to the axis of the connector. A single connecting member or a rod on a single anchor may thereby be entered into an array of keyholes and connected to one or more panels at the same time. Preferably, once an anchor has been connected to a wall panel through a plurality of keyholes, a locking member or key may be inserted into all of the keyholes to wedge or otherwise lock the anchor to the connectors. The locking member may be an integral portion of the anchor. Preferably, however, a portion of the anchor fits readily into all of the keyholes, and is then locked in place by means of a suitable key or locking member.

In one embodiment, the modular facing panel has a plurality of laterally spaced recesses extending into the modular facing panel or wall face positioned substantially equal distances from the top of the wall to define a lateral array of recesses. Also, a laterally disposed passageway within the modular facing panel or retaining wall is positioned to intersect each of the recesses in the array.

The first end of each connector is adapted at the first end to fit within each recess defining a hole proximate to its first end and alignable with the passageway. A bar is also adapted to extend through the passageway and the holes in the connectors. Thus, the array of holes and passageways provides a simple mechanism for mounting the ends of the connectors in the recesses. A short bar may extend through each hole, and the ends of each bar may be embedded within the portions of the panel which lie between the recesses. Preferably, a single elongated bar or rod may extend through each hole as well as corresponding holes in the panel between the recesses. If the panel is a precast panel, the bars or rods may be positioned within the mold prior to the casting and thereby be integrated with the panel during the casting process.

In a preferred form of the invention, a mooring unit is precast into the back of a modular facing panel. The mooring unit comprises an array of laterally spaced galvanized steel plates. The galvanized plates are bent at a 90 degree angle, in an L-shape, at the end of the plate that is precast into the panel. The number of connectors used in mooring unit may vary depending on the height of the mechanically stabilized earth structure.

Furthermore, the galvanized plate has a keyhole formed near the other end which allows the end of a grid reinforcement unit or grid anchor to be placed in the keyhole along with a galvanized bar to lock the anchor in place. Although the preferred form of the invention uses galvanized steel plates, it is contemplated that other metallic materials may be used.

The placement of the keyhole on the galvanized plate is such that, when assembled, the grid anchor is laterally disposed and perpendicular to the modular facing panel when the grid anchor is put in place in the backfill. In addition, the placement of the keyhole on the galvanized plate is such as to cause forces pulling on the grid anchor to be substantially perpendicular to the modular facing panel. A key feature of this placement is to even out the load on the modular facing panel.

It will be apparent that the invention provides a quick and simple system for installing a mechanically stabilized earth retaining wall. The modular panels may have any suitable periphery and configuration for assembly of the panels to form a wall. In studies of the invention, a panel having twelve sides has been found to be very effective; however, it is contemplated that variety of conventional designs may be employed.

Precast concrete panels are especially contemplated for use; however, other suitable materials may be used. Similarly, grid-like anchor members and plate-type connectors appear especially desirable. Concrete panels which are laterally aligned may be connected to a single anchor; however, it is contemplated that separate anchors for separate panels are preferred. Each panel should preferably have a plurality of connectors which serve as a mooring unit for that panel.

The system may employ a variety of laterally disposed anchors. The anchor component used with the invention may be a plurality of linear strips with one end attached to a rod. The anchor may also comprise a sheet with a connected to a a rod. With a grid type anchor, the anchors are made of various materials such as metal, polymer, or the like which each material having the characteristics which make it most suitable for a particular application. Each panel requires one or more anchors placed in the appropriate areas.

Furthermore, in attaching rods to the anchors, the rods are adapted to fit within each keyhole. In some cases the rod may be already present as a part of the anchor. For example, with grid reinforcement units or anchors, an edge of the mesh actually is rod. Thus, no modification is necessary. A locking member is configured to fit within each keyhole to lock the rod within the keyhole. The locking member may be round, square, or some other suitable shape. It is contemplated that the connector may contain two or more key holes for attachment of multiple anchors or for increased strength.

The unique connecting system provided for connecting modular facing panels to grid reinforcement units has the unique advantage of reducing the time and labor required in the field, and, thus, reduces the costs of the system.

BRIEF DESCRIPTION OF THE DRAWINGS

Other objects, features and advantages of the present invention will become apparent upon a consideration of the following detailed description and the accompanying drawings, in which:

FIG. 1 is a fragmentary prospective view showing part of a retaining wall built with the invention.

FIG. 2 is a perspective view of a panel, mooring unit, and an anchor illustrating one embodiment of the invention.

FIG. 3 is a cross-sectional view of a portion of the modular facing panel and a mooring unit with an anchor attached.

FIG. 5B is a side view of a connector with an anchor locked in the keyhole.

DESCRIPTION OF THE PREFERRED EMBODIMENTS

Figure 4:
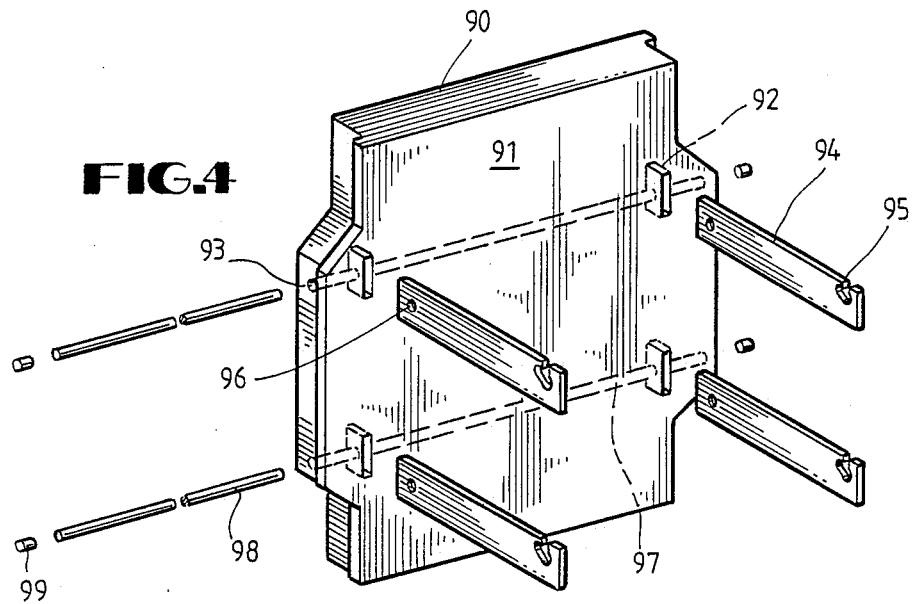
FIG. 4 is a perspective view of a modular facing panel with a mooring unit in one embodiment of the invention.

Referring to FIG. 1, a mechanically stabilized earth wall structure comprises an upright retaining wall, shown generally at 34. The upright retaining wall 34 is formed from a plurality of modular facing panels 30 with a front facing, a back facing, a top, and a bottom, which may be of any suitable geometric shape and which are depicted herein as dodecagon in shape. Each modular facing panel 30 has associated with it a one or more mooring units connected to each panel 30. The mooring units comprise a laterally disposed array of connectors 33 projecting from the back facing of the panel. Each connector 33 has a first end extending into the panel 30 and a second end with a keyhole 35 proximate to the second end aligned with corresponding keyholes 35 in the other connectors 33. The system also comprises a laterally disposed anchor 32. A rod is attached to the anchor 32 and adapted to fit within each keyhole 35. The connector 33 and the anchor 32 hold the retaining wall in place to the underlying mass 31, such as earth-to-earth backfill. A locking member is configured to fit within each key hole to lock the rod in within the keyhole 35.

The anchors 32 are made of various materials such as metal, glass, polymer or the like with each material having characteristics most suitable for a particular application. The anchor 32 may be in the form of a grid reinforcement unit or grid anchor, as shown in FIG. 1 with similar anchors shown in FIGS. 2, 3, 5A, 5B, and 6, having a plurality of first parallel members with a first end extending toward the back facing of the panels 30 and a plurality of second parallel members rigidly attached to the first parallel members in a direction substantially parallel to the first parallel members. A grid anchor may comprise a polymeric or metallic substance. Additionally, the anchor may comprise a sheet of geotextiles. The anchor may also comprise a plurality of linear strips with one end of the strips attached to a rod, or may be in the form of strips, as are well known.

While each modular facing panel 30 requires a number of connectors 33 and anchors 32. The positioning of the connectors 33 and anchors 32 are not material to the instant invention. Additionally, the number of connectors needed may vary with wall height. Thus, the figures are merely illustrative of the connection of the anchor 32 to the modular facing panel 30 via the connector 33.

Each panel 30 has at least one row of connectors 33 with two or more connectors 33 in each row. Each connector 33 has at least one keyhole 35 formed in the connector 33. It is contemplated that an anchor 32 may require that the connector 33 contain two or more keyholes 35. It is known that the panels 30 can be made from any materials suited for the intended usage, including but not limited to wood, polymer, concrete, or metal. The panels 30 may be made in castings, whereupon the connector 33 is precast into the panel 30.

Referring to FIG. 2, a mooring unit is precast into the facing panel 50 in one embodiment. The mooring unit is formed by a bar 55 and a plurality of connectors 52. Each connector 52 has a hole 58 in the end extending into the back facing 51 of the modular facing panel 50. A keyhole 57 is formed on one edge of the connector 52. A laterally disposed anchor 54 includes a rod 53 configured to fit an opening into the keyhole 57 with a locking member 56. Placing the locking member 56 in the keyholes 57 with the rod 53 locks the rod 53 and anchor 54 in place. In this embodiment, locking member 56 is a round galvanized bar.

FIG. 3 shows a cutaway of a modular facing panel 70 with the mooring unit cast into the modular facing panel 70. The mooring unit is formed from a plurality of connectors 74 and a bar 76. The connector 74 defines a hole 71 capable of mating with a bar 76. Also, the hole 71 is in alignment with all other holes 71 in the array of spaced connectors 74. Thus, the mooring unit is formed from a plurality of connectors 74 positioned in an array and a bar 76 that mates with holes 71 in the connectors 74.

The keyhole 77 in this embodiment is in the shape of a J-slot. The keyhole 77 is formed such that a rod 75 connected to an anchor 72 can be placed within the keyhole 77 and locked in place by sliding a locking member 73 into the keyhole 77.

One of the advantages of this invention is that the amount of time needed to connect an anchor to a modular facing panel is much less than that needed to connect anchors to facing panels using bolts or sliding anchors into modular facing panels.

FIG. 4 shows another embodiment of the invention. The modular facing panel 90 comprises a plurality of laterally spaced recesses 92 extending into the back facing 91 of the modular facing panel 90 positioned to define a lateral array of such recesses. Additionally, a laterally disposed passageway 97 within the modular facing panel 90 is positioned to intersect each of the recesses 92 in the array. The recesses 92 and passageway 97 are formed during casting of the modular facing panel 90. The passageway 97 contains at least one opening 93 to allow the bar 98 to be placed into the passageway 97.

The first end of each connector 94 is adapted to fit within each recess 92 with each connector 94 defining a hole 96 proximate to its first end and alignable with the passageway 97. A bar or bar-like member 98 is adapted to extend through the passageway 97 and the holes 96 in the connectors 94. A cap 99 may be placed in the opening 93 to prevent the bar 98 from sliding out of the passageway, and thus holding the connectors 94 in place. The connectors 94 again have keyholes 95 formed to allow a locking member and a rod attached to an anchor to be locked into the keyholes 95.

The advantage of this embodiment is that the amount of room needed for storage or transportation of the modular facing panels 90 is decreased because the connectors 94 do not need to extend out of the modular facing panel 90 while the units are in storage or transportation.

Figure 5A:
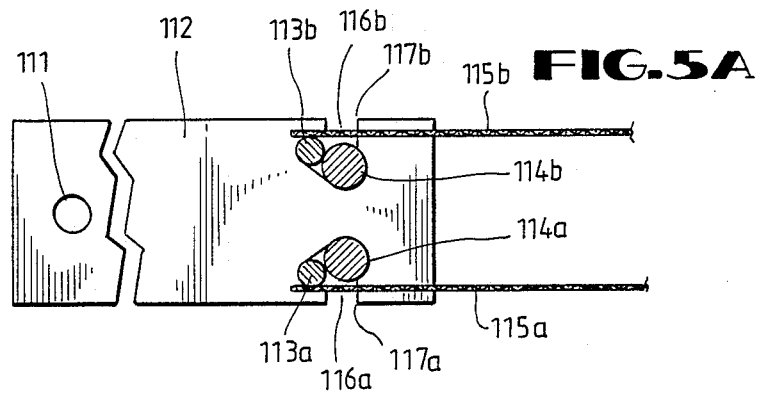
FIG. 5A is a side view of a connector with two anchors locked in two keyholes.

In FIG. 5A, a side view is shown of a connector 112 with a locking member 114a, 114b and a rod 113a, 113b attached to an anchor 115a, 115b locked into the keyhole 116a, 116b. Attachment of a laterally disposed anchor is accomplished by including a rod 113a, 113b configured to fit through the openings 117a, 117b into the keyholes 116a, 116b. In this embodiment, the keyhole 116a, 116b is in a shape of a J-slot. A locking member 114a, 114b is adapted to be fitted within the keyholes with the rod 113a, 113b and prevent the rod 113a, 113b from exiting the keyholes 116a, 116b through the openings 117a, 117b. Thus, when the locking member 114a, 114b is placed into the keyhole 116a, 116b, the arrangement locks the rod 113a, 113b and the locking member 114a, 114b in place. In this embodiment, the keyhole 116a, 116b is in the shape of a J-slot. The keyhole 116a, 116b can be formed in the top, the bottom, or the outer edge of the connector 112. A hole 111 is formed near the other end of the connector 112 to allow a bar to be placed into the hole 111.

FIG. 5B also shows a side view of a connector 121 with a locking member 123 and a rod 122 attached to an anchor 124 locked into the keyhole 125. The keyhole 125 is in a shape of a J-slot. This keyhole 125 is formed such that the rod 122 can drop into the opening 126. When the locking member 123 is placed into the keyhole 126, the arrangement locks the rod 122 and the locking member 123 in place. FIG. 5B differs from the orientation in FIG. 5A in that in FIG. 5B the anchor 124 and the rod 122 are located farther from the opening 126 of the keyhole 125 such that the anchor 124 is located below the locking member 123 when the keyhole 125 is formed in the upper edge of the connector 121, instead of being above the locking member 123 as show in FIG. 5A.

Figure 6:
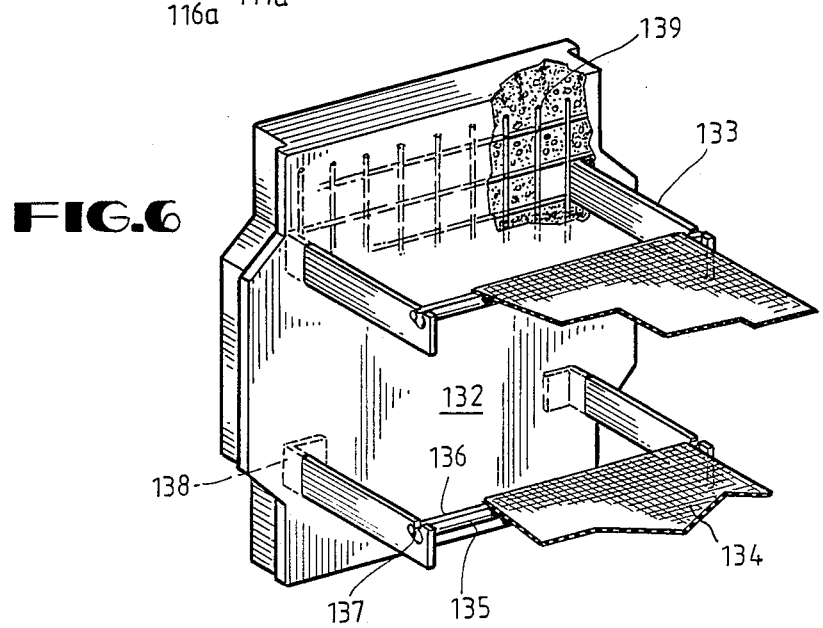
FIG. 6 is a perspective view of a modular facing panel, mooring units, and anchors attached to the mooring units in another embodiment of the invention.

Referring to FIG. 6, a modular facing panel 132 shows another embodiment of the invention. The connectors 133 in this embodiment are not connected by a bar within the modular facing panel 132. Instead, each connector 133 has one end bent in an L-shape 138. Thus, the first end of each connector 133 terminates within the modular facing panel 132 in an L-shape. The other end has a keyhole 137 adapted to fit a locking member 135 and a rod 136 with an anchor 134 attached to it. The connector 133 is placed in the mold for the panel 132 such that the L-shape 138 is behind the wire mesh 139 in the mold.

In stabilizing an earth wall structure components are fabricated. In constructing components for a mechanically stabilized earth structure, one or more mooring units are made by forming a plurality of connectors, each with a first end anchored in a modular facing panel and a keyhole near a second end capable of receiving one end of an anchor attached to a rod adapted to fit into the keyhole, and positioning the connectors in an array on the backfacing of the panel. In forming the mooring unit, the first ends of the connectors may each define a hole adapted to mate with a bar. In forming the connectors, the first ends of the connectors may terminate in an L-shape.

Next is casting a plurality of modular facing panels having a front facing and a back facing, each of the modular facing panels including a means for assembling the modular facing panels in an upright wall in an interlocking fashion. The step before casting is anchoring laterally one or more of the mooring units in each of the modular facing panels during casting of the modular facing panels so that the second ends of the connectors and the keyholes of the anchoring units extend outwardly from the back facing of the panel.

Anchors are formed with each anchor having two ends, a plurality of first parallel members, and a plurality of second parallel members rigidly attached the first parallel members in a direction perpendicular to the first parallel members. The anchors may be elongated and generally rectangular in shape. The next step is attaching rigidly a rod to one end of the anchor for attaching one the anchor with the rod in the keyhole in the anchoring unit. When using a grid anchor, the attachment of the rod to the anchor may be skipped since the ends of the grid form the rod.

The modular facing panels can also be formed by casting a plurality of laterally spaced recesses extending into the modular facing panel positioned to define a lateral array of such recesses; casting a laterally disposed passageway within the modular facing panel positioned to intersect each of the recesses in the array; and leaving an opening on at least one end of the passageway. In this embodiment, the mooring is formed by placing a first end of connector adapted to fit the recesses defining a hole proximate to the first end and alignable with the passageway into the recess; repeating this step until all recesses are filled by the connectors; and placing a bar into the passageway and through the holes of the connectors. Now, the modular facing is panel ready to be put in place and connected to an anchor.

After constructing the components, a row is assembled by interlocking modular facing panels in a row, placing backfill on back side of the wall up to a level below the array of connectors in the mooring unit, attaching anchors to mooring units by placing rods into keyholes, locking anchors in keyholes by placing locking members into keyholes, covering anchors with backfill. The height of the earth wall structure is increased by assembling an additional row of panels on the top edge of the earth wall structure. Rows are added to the top edge of the earth wall structure until desired height is reached.

The description of the preferred embodiments of the present invention has been presented for purposes of illustration and description, but is not intended to be exhaustive or limit the invention in the precise form disclosed. For example, although the locking members shown in the figures are in the shape of a round bar, other shapes and forms may be used, i.e., a square bar. Also, the rod may actually be part of the anchor. For example in a grid anchor, one edge of the grid may serve as the rod for placement in the keyholes. Obviously, many modifications and variations will be apparent to practitioners skilled in this art. The embodiment was chosen and described in order to best explain the principles of the invention and the practical application to enable others skilled in the art to understand the invention for various embodiments and with various modifications as are suited to the particular use contemplated.

What is claimed is:

1. A mechanically stabilized earth wall structure comprising:
   (a) an upright retaining wall formed from a plurality of interlocking modular facing panels having a front facing, a back facing, a top, and a bottom;
   (b) one or more mooring units connected to each said panel, each mooring unit comprising a laterally disposed array of spaced connectors projecting from said back facing of said panel, each connector having a first end extending into said panel, and a second end, and a keyhole proximate from said second end aligned with corresponding keyholes in said array of connectors;
   (c) a laterally disposed anchor;
   (d) a rod attached to said anchor and adapted to fit within each said keyhole; and
   (e) a locking member configured to fit within each keyhole to lock said rod within said keyhole.

2. The apparatus of claim 1 wherein near said first end of each said connector defines a hole capable of mating with a bar and said hole is in alignment with all other holes in said array of spaced connectors.

3. The apparatus of claim 1 wherein said connector contains two or more key holes.

4. The apparatus of claim 1 wherein said keyhole is a J-slot.

5. The apparatus of claim 1 wherein said modular facing panel further comprises a plurality of laterally spaced recesses extending into said modular facing panel positioned to define a lateral array of such recesses and a laterally disposed passageway within said modular facing panel positioned to intersect each of said recesses in said array.

6. The apparatus of claim 5 wherein said first end of each said connector is adapted to fit within each said recess, each connector defining a hole proximate to its first said end and alignable with said passageway and a bar is adapted to extend through said passageway and said holes in said connectors.

7. The apparatus of claim 5 wherein said passageway contains at least one opening.

8. The apparatus of claim 1 wherein said first end of each said connector terminates within said modular facing panel in an L-shape.

9. The apparatus of claim 1 wherein said anchor comprises a sheet which is comprised of materials selected from the group consisting of polymeric materials and metallic materials.

10. The apparatus of claim 1 wherein said anchor comprises a plurality of linear strips with one end of each strip connected to said rod which is comprised of materials selected from the group consisting of polymeric materials and metallic materials.

11. The apparatus of claim 1 wherein said anchor comprises a grid anchor having a plurality of first parallel members and a plurality of second parallel members rigidly attached said first parallel members in a direction substantially perpendicular to said first parallel members with said first end of said grid extending toward said back facing of said panels which is comprised of materials selected from the group consisting of polymeric materials and metallic materials.

12. A mechanically stabilized earth structure comprising:
   (a) a vertically disposed retaining wall having a front facing, a back facing, a top, and a bottom;

(b) a plurality of laterally spaced recesses extending into said wall face positioned to define a lateral array of such recesses;

(c) a laterally disposed passageway within said retaining wall positioned to intersect each of said recesses in said array;

(d) a connector adapted at a first end to fit within each said recess, each connector defining a hole proximate its first said end and alignable with said passageway;

(e) a second end of each connector projecting from said wall face and including an opening extending into an edge of said connector terminating in keyhole within said connector;

(f) a laterally disposed anchor, including a rod configured to fit through said openings into said keyholes;

(g) a locking member adapted to be fitted within said keyholes with said rod and preventing said rod from exiting said keyholes through said openings; and (h) a bar adapted to extend through said passageway and said holes in said connectors.

13. The apparatus of claim 12 wherein said connector contains two or more key holes.

14. The apparatus of claim 12 wherein said keyhole is a J-slot.

15. A mechanically stabilized earth structure comprising:

(a) an upright retaining wall formed from a plurality of interlocking modular facing panels having a front facing and a back facing, a top and a bottom;

(b) a mooring unit precast into the panel, each mooring unit comprising a plurality of laterally spaced connectors positioned in an array with each connector having a first end and a second end, said first end terminating in an L-shape within said modular facing panel with said second end extending outward from said back facing of modular facing panel, a keyhole capable of receiving a rod and a locking member with said keyhole located such that said keyhole extends beyond said back facing of said panel, and said bar mating with holes in said connectors; and (c) a plurality of anchors, each anchor having a plurality of first parallel members and a plurality of second parallel members rigidly attached said first parallel members in a direction substantially perpendicular to said first parallel members with said first end of said grid extending toward said back facing of said panels, a rod attached to said second end of said first parallel members perpendicular to said first parallel members, and said rod placed into said keyholes with said locking member preventing rod from exiting keyhole.

16. A method of mechanically stabilizing earth wall structure with front side, a back side, and a top edge comprising:

(a) constructing components for said structure comprising (1) making one or more mooring units by forming a plurality of connectors, each with a first end anchored in a modular facing panel and a keyhole near a second end capable of receiving one end of an anchor attached to a rod adapted to fit into said keyhole and positioning said connectors in an array on the back facing of said panel, (2) casting a plurality of modular facing panels having a front facing and a back facing, each of said modular facing panels including a means for assembling said modular facing panels in an upright wall in an interlocking fashion, and (3) anchoring laterally one or more of said mooring units in each of said modular facing panels during casting of said modular facing panels so that said second ends and the keyholes of said anchoring units extend outwardly from said back facing of said panel;

(b) assembling a row by
(1) interlocking modular facing panels in a row,
(2) placing earth backfill on back side of said wall up to a level below said array of connectors in said mooring unit,
(3) attaching anchors to mooring units by placing rods into keyholes,
(4) locking anchors in keyholes by placing locking members through keyholes,
(5) covering anchors with earth backfill;

(c) increasing the height of said earth wall structure by assembling an additional row of panels on said top edge of said earth wall structure; and (d) adding rows to said top edge of said earth wall structure until desired height is reached.

17. The method of claim 16 for stabilizing an earth wall structure in which casting of the modular facing panels is further defined by (a) casting a plurality of laterally spaced recesses extending into said modular facing panel positioned to define a lateral array of such recesses and (b) casting a laterally disposed passageway within said modular facing panel positioned to intersect each of said recesses in said array;

(c) leaving an opening on at least one end of the passageway;

(d) placing a first end of connector adapted to fit said recesses defining a hole proximate to said first end and alignable with said passageway into said recess;

(e) repeating step (a) until all recesses are filled by said connector; and (f) placing a bar into said passageway and through said holes of said connectors.

18. The method of claim 16 for stabilizing an earth wall structure further is defined as forming a plurality of elongated generally rectangular anchors, each anchor having (a) two ends, (b) a plurality of first parallel members, and (c) a plurality of second parallel members rigidly attached said first parallel members in a direction perpendicular to said first parallel members; and (d) attaching rigidly a rod to one end of said anchor for attaching one end said anchor with said rod in said keyhole in said anchoring unit.

19. The method of claim 16 wherein in forming said mooring unit said first ends of said connectors each defines a hole adapted to mate with a bar and said bar mating with said holes.

20. The method of claim 16 wherein forming said connectors said first ends of said connectors terminate in an L-shape.

* * * * *